US011616643B2

(12) United States Patent
Be'ery et al.

(10) Patent No.: US 11,616,643 B2
(45) Date of Patent: Mar. 28, 2023

(54) SYSTEM AND METHOD OF MANAGEMENT OF A SHARED CRYPTOGRAPHIC ACCOUNT

(71) Applicant: ZENGO LTD., Tel Aviv (IL)

(72) Inventors: Tal Arieh Be'ery, Petach Tikva (IL); Ouriel Ohayon, Tel Aviv (IL); Omer Shlomovits, Petach Tikva (IL); Gary Benattar, Netanya (IL)

(73) Assignee: ZENGO LTD., Tel Aviv (IL)

( * ) Notice: Subject to any disclaimer, the term of this patent is extended or adjusted under 35 U.S.C. 154(b) by 0 days.

(21) Appl. No.: 17/847,461

(22) Filed: Jun. 23, 2022

(65) Prior Publication Data

US 2022/0337400 A1  Oct. 20, 2022

Related U.S. Application Data

(63) Continuation of application No. PCT/IL2020/051313, filed on Dec. 21, 2020.
(Continued)

(51) Int. Cl.
*H04L 9/08* (2006.01)
*H04L 9/00* (2022.01)
(Continued)

(52) U.S. Cl.
CPC .......... *H04L 9/085* (2013.01); *H04L 9/0819* (2013.01); *H04L 9/0861* (2013.01); *H04L 9/50* (2022.05);
(Continued)

(58) Field of Classification Search
CPC ... G06F 21/602; H04L 9/3242; H04L 9/0819; H04L 9/56; H04L 9/085; H04L 2209/46
See application file for complete search history.

(56) References Cited

U.S. PATENT DOCUMENTS 10,630,471 B1 * 4/2020 Lindell ................. H04L 9/0861
2018/0367298 A1   12/2018 Wright et al.
(Continued)

FOREIGN PATENT DOCUMENTS

CN         110602246 A  * 12/2019  ............ H04L 67/10
WO     WO-2019/034951      2/2019
WO     WO-2019034951 A1 *  2/2019  ........... H04L 9/0637

OTHER PUBLICATIONS

"Threshold-Optimal DSA/ECDSA Signatures and an Application to Bitcoin Wallet Security"—Gennaro et al, City College, City University of New York, Jun. 9, 2016 chrome-extension://efaidnbmnnnibpcajpcglclefindmkaj/https://eprint.iacr.org/2016/013.pdf (Year: 2016).*

(Continued)

*Primary Examiner* — Randy A Scott
(74) *Attorney, Agent, or Firm* — Pearl Cohen Zedek Latzer Baratz LLP

(57) ABSTRACT

Systems and methods of managing a shared cryptographic account for a first user and at least one second user in a blockchain based computer network, including: generating, by a first computing device of the first user, a first share of a cryptographic key, generating, by a server, a corresponding second share of the cryptographic key, wherein the cryptographic key corresponds to a public key and private key pair, and wherein the private key is configured to decrypt shares of the cryptographic key that are encrypted by the public key, generating a group ID for a group of users of the shared cryptographic account, distributing, by the server, the first share among each of the at least one second user, and enforcing a signing logic scheme for users of the group when signing with the shared cryptographic account.

19 Claims, 5 Drawing Sheets

Related U.S. Application Data

(60) Provisional application No. 62/952,507, filed on Dec. 23, 2019.

(51) Int. Cl.
    *G06F 21/60* (2013.01)
    *H04L 9/32* (2006.01)

(52) U.S. Cl.
    CPC .......... *G06F 21/602* (2013.01); *H04L 9/3242* (2013.01); *H04L 2209/46* (2013.01)

(56) References Cited

U.S. PATENT DOCUMENTS

2019/0007205 A1  1/2019  Corduan et al.
2020/0084048 A1* 3/2020  Lindell ................. H04L 9/3255
2020/0266997 A1* 8/2020  Monica ............... H04L 63/0478

OTHER PUBLICATIONS

"An Introduction to Threshold Signature Wallets with MPC"—Sepior, Block Daemon, Apr. 22, 2019 https://sepior.com/blog/2019/4/22/an-introduction-to-threshold-signature-wallets-with-mpc (Year: 2019).*

Gennaro et al., "Threshold-optimal DSA/ECDSA signatures and an application to Bitcoin wallet security", International Conference on Applied Cryptography and Network Security, Springer International Publishing Switzerland 2016, pp. 156-174.

International Search Report for PCT application No. PCT/IL2020/051313, dated Feb. 23, 2021.

* cited by examiner

```
┌─────────────────────────────────────────────────────┐
│ Generating, by a first computing device of the first │
│ user, a first share of a cryptographic key, based on │
│        a multi-party computation (MPC) protocol      │
└─────────────────────────────────────────────────────┘
                         ↳ 301
                          ↓
┌─────────────────────────────────────────────────────┐
│  Generating, by a server, a corresponding second     │
│  share of the cryptographic key, based on the MPC    │
│                       protocol                       │
└─────────────────────────────────────────────────────┘
                         ↳ 302
                          ↓
┌─────────────────────────────────────────────────────┐
│  Generating a group ID corresponding to a group of   │
│     users of the shared cryptographic account        │
└─────────────────────────────────────────────────────┘
                         ↳ 303
                          ↓
┌─────────────────────────────────────────────────────┐
│ Receiving, by at least one second computing device   │
│ of the at least one second user, the group ID and    │
│                    the private key                   │
└─────────────────────────────────────────────────────┘
                         ↳ 304
                          ↓
```

FIG. 3A

SYSTEM AND METHOD OF MANAGEMENT OF A SHARED CRYPTOGRAPHIC ACCOUNT

CROSS REFERENCE TO RELATED APPLICATION

This application is a Continuation Patent Application of PCT International Application No. PCT/IL2020/051313, International Filing Date Dec. 21, 2020, claiming the benefit of U.S. Provisional Patent Application No. 62/952,507, filed Dec. 23, 2019, both of which are hereby incorporated by reference.

FIELD OF THE INVENTION

The present invention relates to blockchain based computer networks. More particularly, the present invention relates to systems and methods for management of cryptographic keys of a shared cryptographic account.

BACKGROUND OF THE INVENTION

Many blockchain based computer networks are available now with their own tokens or cryptocurrencies (for example 'Ethereum' and 'Bitcoin'). Such blockchain based networks usually have a list or ledger of data records (or blocks) that are linked using cryptography. Each block can contain a cryptographic hash of the previous block, a time stamp of each recorded action, etc. Some blockchain based computer networks may also be used to track medical records, shipping records, entertainment media, etc.

Currently, users that want to manage their assets on a blockchain based network, for instance exchange tokens or cryptocurrencies, need to have an account (e.g., a blockchain wallet) associated with that blockchain based network. For example, a user may send tokens to another user's address (e.g., an identifier with alphanumeric characters) that represents a destination on the blockchain for the exchange. Usually, each account associated with the blockchain based computer network may have access to at least one address.

A shared account (and/or wallet and/or address) is a need for many users, such that the shared account may be controlled by a group of individuals who approve management of assets (e.g., transactions) on the blockchain according to some pre-defined logic. An example of a shared account may be a business partners account in which two out of three partners can sign or approve an action.

Currently, the control over accounts associated with blockchain based networks is atomic, such that shared accounts are not available. In an atomic account, whoever is in control of a private key, corresponding to the account, may unilaterally control (e.g., carry out transactions) from this account such that other parties may not be involved. Generally, cryptographic keys (e.g., a key may be a string of data used to lock or unlock cryptographic functions) may control the addresses.

In typical classic blockchain software implementations, a client locally generates a private key and a corresponding public key. The public key can be used to create an address and/or the messages to be signed may be transactions of value between such addresses (or accounts). Verification of transaction validity may be done publicly by the blockchain maintainers using the relevant addresses' public keys, while the key generation may be done locally using the client's secret key. It should be noted that the local data is not public, and therefore key generation carried out locally may not be accessible by other parties as with public key generation. In order to achieve a distributed signing for blockchain algorithms, it may be required to change the key generation algorithm (i.e., generating a private-public keypair) and/or signing protocols without affecting the public verification protocol. This may be achieved for instance by validating a signature on a message using the public key.

Distributed key generation protocols may involve two main parts: a local secret data being generated (similar to the original centralized key generation protocol) by each of the parties, and communication between the participating parties to provide the necessary view to all other parties to compute the composed public key (and resulting address), and to later generate the signatures. Distributed signing occurs only after the key generation and usually involves an interactive protocol for each party: receiving a message to sign, and applying local computation on the message using local data previously generated on the key generation protocol to distribute the results and compute a signature locally. Splitting of the signing functionality (such that several parties are involved in each signature) may be currently considered as best practice for security and is implemented in some of the blockchain networks, as the "multi-signature" extension, in which multiple signers are explicitly assigned with multiple distinct keys by a dedicated signature algorithm.

Some shared accounts are available with a trusted third-party service, in which the service holds the private key of the account. If the service works correctly, it may manage the life cycle of a group of users: creation, adding and removing members, defining and modifying the control logic, etc. When a transaction is initiated by a group member, the service may verify the identities of the signing members through authentication and accordingly enforce the signing logic. However, the downside of this service is that it may spend unilaterally, if it becomes rogue, hacked, etc.

Another shared account is available with naïve sharing, in which certain simple governance mechanisms (e.g., "anyone of the group may spend") may be implemented via the explicit sharing of the private key. However, this kind of service does not scale to other governance mechanism.

Another shared account is available with application level multi-signatures ("MultiSig"), in which many blockchain networks (e.g., "Bitcoin", "Ethereum", etc.) offer the ability to explicitly control a single address with multiple keys. Each of the group members generates a key and a blockchain script (sometime called a smart contract) may be used to define and verify the signing logic. However, these implementations are blockchain specific (e.g., the "Ethereum" solution is completely different from the "Bitcoin" implementation) thus requiring more maintenance, require a transaction (which entails fees) when the controlling mechanism changes, and may expose the control mechanism on the blockchain.

Another shared account is available with multi-party computation (MPC) based threshold signature scheme (TSS), in which each of the group members generates a share using the TSS protocol of key generation and the TSS signature defines and verifies the signing logic in the mathematical level. This service addresses many of the deficiencies of the aforementioned "MultiSig" service as it's blockchain agonistic because the TSS mechanism is opaque to the blockchain. However, it still requires an explicit transaction to change the control mechanism, does not scale to large groups and has a complex control mechanism. Another disadvantage of this method is that it requires for all signing members to be online on the same time which may be prohibitive for large groups.

There is therefore a need for enabling management of assets of blockchain networks with a shared account for a group of users.

SUMMARY

There is thus provided, in accordance with some embodiments of the invention, a method of managing a shared cryptographic account for a first user and at least one second user in a blockchain based computer network, the method including: generating, by a first computing device of the first user, a first share of a cryptographic key, based on a multi-party computation (MPC) protocol, generating, by a server, a corresponding second share of the cryptographic key, based on the MPC protocol, wherein the cryptographic key corresponds to a public key and private key pair, and wherein the private key is configured to decrypt shares of the cryptographic key that are encrypted by the public key, generating a group ID for a group of users of the shared cryptographic account, receiving, by at least one second computing device of the at least one second user, the group ID and the private key, receiving, by the server, the group ID and the first share from the first computing device, distributing, by the server, the first share among each of the at least one second user; and enforcing a signing logic scheme for users of the group when signing with the shared cryptographic account. In some embodiments, the group includes the first user and the at least one second user.

In some embodiments, a message signed with the first share is sent to the server, for signing, by the server, of the received message with the second share, and a transaction is added to a ledger of the computer network, in accordance with the received message signed by the first share and second share. In some embodiments, the message signed by the first share and the second share is configured to be decrypted by the private key, and wherein the message is signed by at least one of: the first computing device and the second computing device.

In some embodiments, the signing logic scheme includes a signing order among the users of the group. In some embodiments, at least a portion of a cryptographic key of the computer network is verified, wherein the verifying includes: encrypting, by the first computing device, at least a portion of the cryptographic key with the public key, sending, by the first computing device, the encrypted at least a portion of the cryptographic key to the server, retrieving, by the server, the public key from the first computing device, and verifying, by the server, that the encrypted at least a portion of the cryptographic key is compatible to be decrypted by the private key, based on the retrieved public key and the corresponding public key of the at least a portion of the cryptographic key.

In some embodiments, the server receives the group ID and the private key from the first computing device. In some embodiments, the public key and the private key are received by the first computing device, and the public key is received by the server. In some embodiments, the public key is distributed, by the server, among each of the at least one second user. In some embodiments, the group ID is generated by the first computing device. In some embodiments, at least one second user is added to the group.

In some embodiments, at least one second user is removed from the group, and a key rotation protocol is applied on the first share. In some embodiments, a key rotation protocol is applied on at least one of the first share and the second share. In some embodiments, the group ID and the private key is distributed, by the first computing device, among the at least one second user. In some embodiments, the group ID is distributed, by the server, among the at least one second user.

There is thus provided, in accordance with some embodiments of the invention, a system for management of a shared cryptographic account for a first user and at least one second user in a blockchain based computer network, the system including: a first computing device of the first user, configured to: generate a first share of a cryptographic key, based on a multi-party computation (MPC) protocol, and generating a group ID for a group of users of the shared cryptographic account, a server, in communication with the first computing device and configured to: generate a corresponding second share of the cryptographic key, based on the MPC protocol, wherein the cryptographic key corresponds to a public key and private key pair, and wherein the private key is configured to decrypt shares of the cryptographic key that are encrypted by the public key, and retrieve the group ID and the first share from the first computing device, and at least one second computing device of the at least one second user, configured to receive from the server: the group ID, the private key, and the first share. In some embodiments, the first computing device is configured to enforce a signing logic scheme for users of the group when signing with the shared cryptographic account, wherein the group includes the first user and the at least one second user.

In some embodiments, the signing logic scheme includes a signing order among the users of the group. In some embodiments, the server is configured to distribute at least one of the public key, the group ID and the private key among each of the at least one second user. In some embodiments, the group ID is generated by the first computing device. In some embodiments, the server is configured to apply a key rotation protocol on at least one of the first share and the second share. In some embodiments, the first computing device is configured to add at least one second user to the group. In some embodiments, the first computing device is configured to remove at least one second user from the group.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 3A-3B show a flowchart of a method of managing a shared cryptographic account for a first user and at least one second user in a blockchain based computer network, according to some embodiments of the invention.

Figure 1:
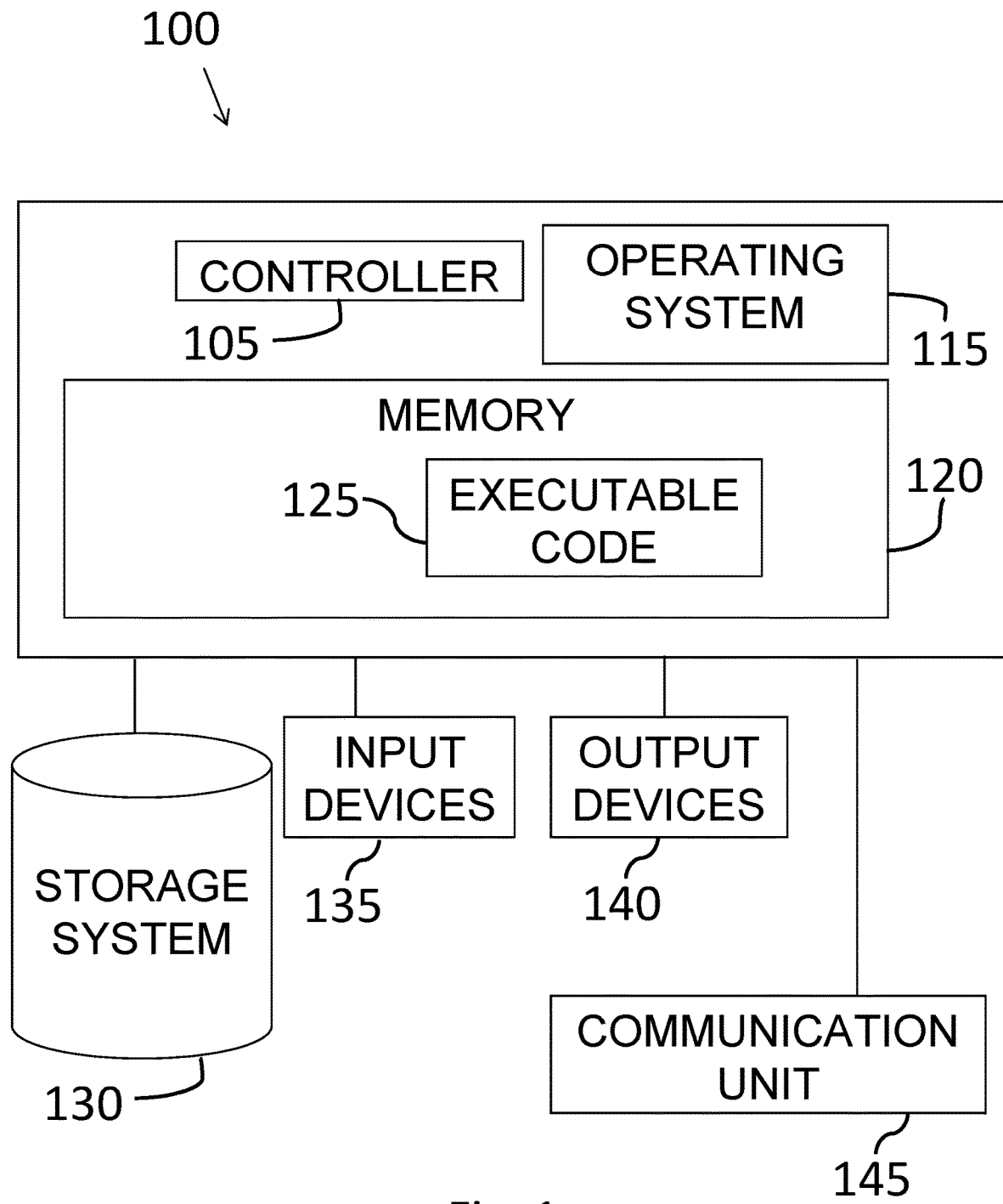
FIG. 1 shows a block diagram of an examplary computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device(s) 100, for example, to act as the various devices or the components shown in FIG. 2A. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of similar and/or different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

According to some embodiments, systems and methods are provided for management of a shared cryptographic account such that when multiple users, for instance users that share the same server in a two-party threshold signatures setup, want to create a shared account (e.g., a wallet holding assets of different blockchain networks), they may use their shared server to securely manage the lifecycle of that shared account. For example, the users may create new shared accounts, add and/or remove members, define and modify the signing logic etc. When a transaction in a blockchain network is initiated by a group member, the server may verify the identity of the signing members by authentication and enforces the signing logic. In some embodiments, the share transfer protocol for two party threshold signatures clients may be confidential, allowing them to send a share controlling a threshold signatures address in a verifiable manner, for example even if the recipient is offline where the server may cache the message for the recipient and verify its content without getting exposed to the content. It should be noted that in contrast to some trusted third-party services for mutual accounts, the server in this scheme is not "trusted" in the sense it cannot unilaterally spend.

Figure 2A:
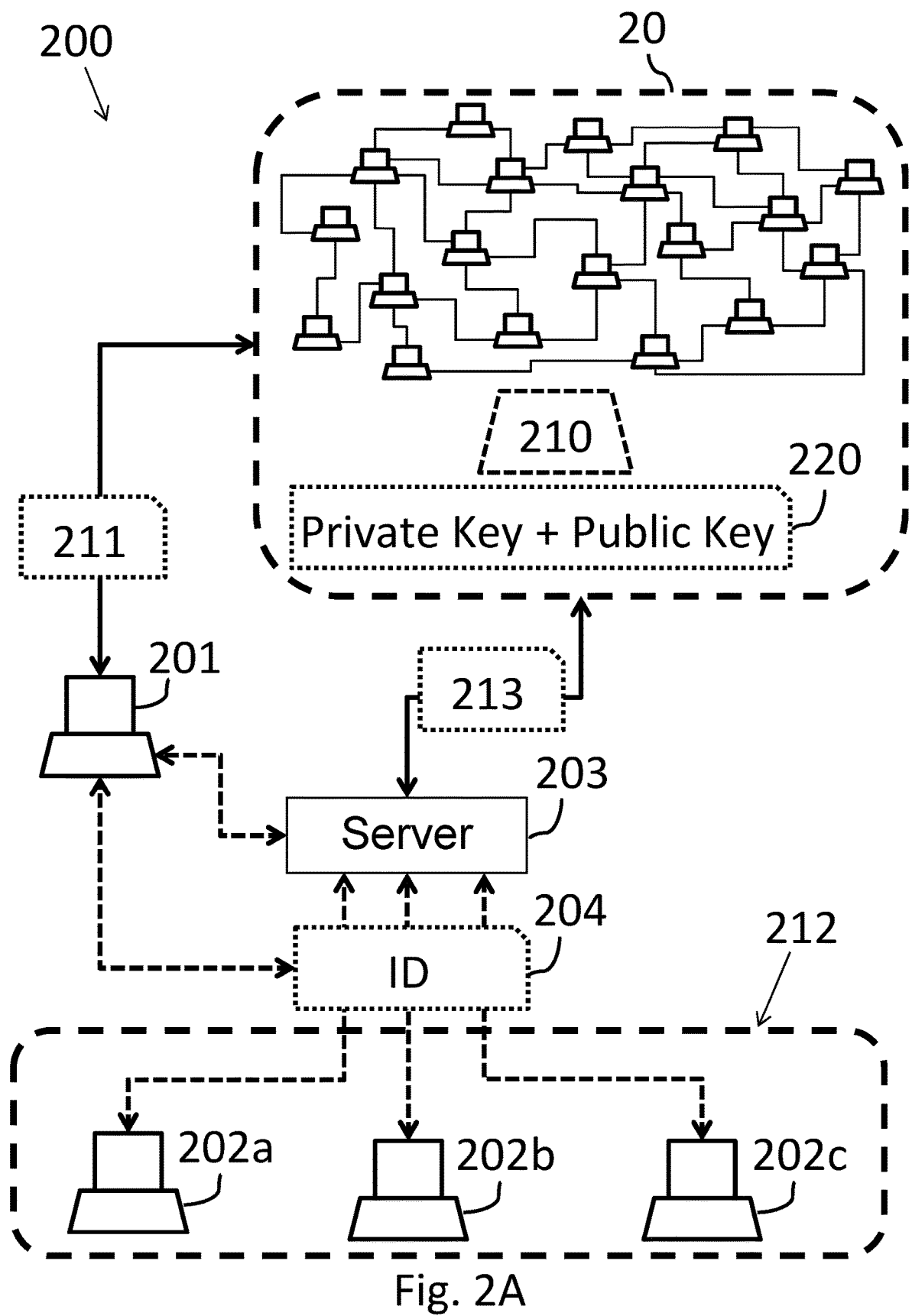
FIGS. 2A-2B show block diagrams of a system for management of a shared cryptographic account for a first user and at least one second user in a blockchain based computer network, according to some embodiments of the invention.
Figure 2B:
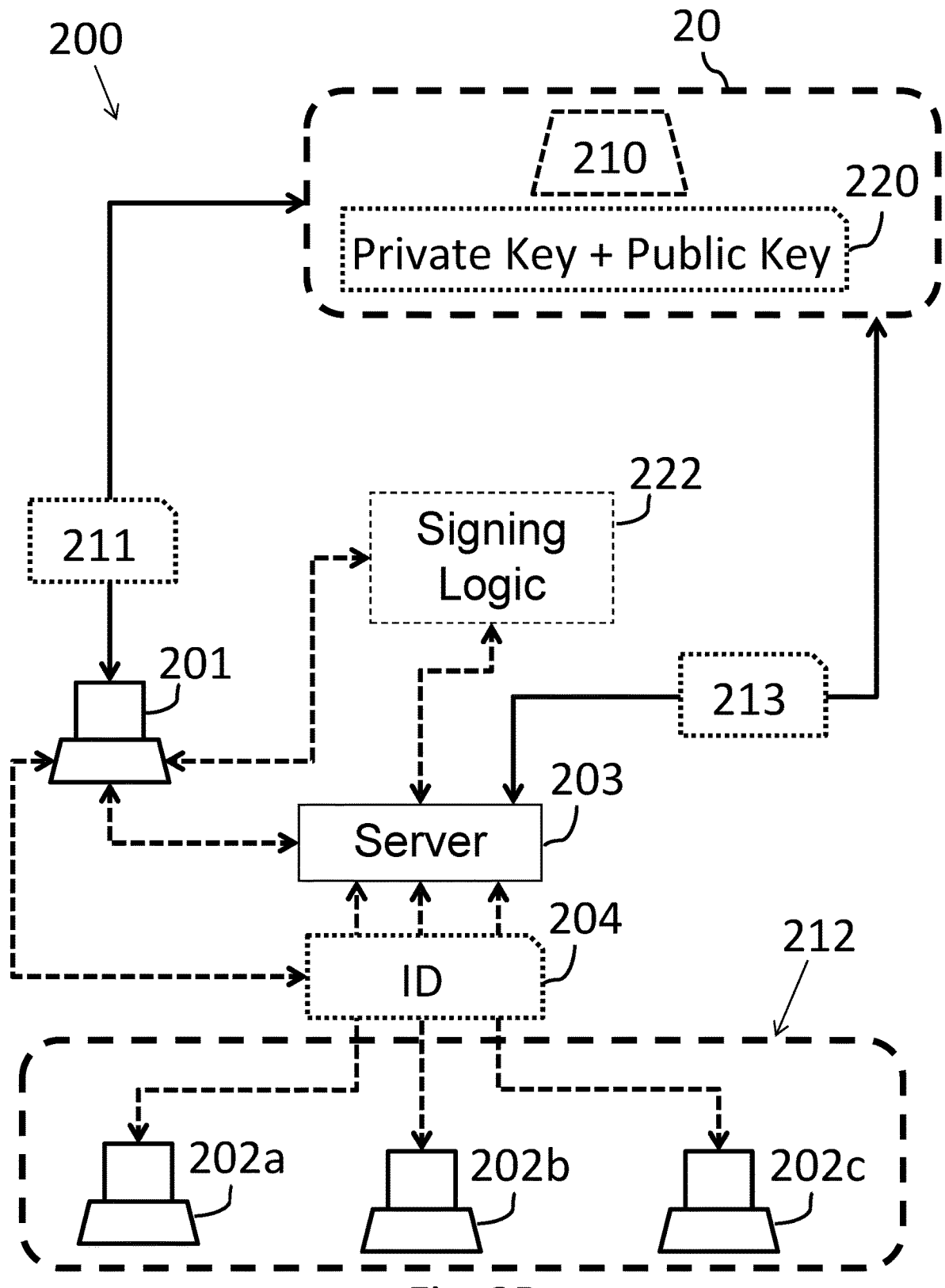

Reference is now made to FIGS. 2A-2B, which show block diagrams of a system 200 for management of a shared cryptographic account 210 for a first user and at least one second user in a blockchain based computer network 20, according to some embodiments. In FIGS. 2A and 2B, hardware elements are indicated with a solid line and the direction of arrows may indicate the direction of information flow.

According to some embodiments, the system 200 may include a first computing device 201 (e.g., such as computing device 100 shown in FIG. 1) of the first user, and at least one second computing device 202a, 202b, 202c of the at least one second user, for instance each computing device may be associated with a different user. It should be noted that while three second computing devices 202a-202c are shown in FIG. 2A, any number of computing devices may similarly apply. In some embodiments, at least two users of the at least one second computing device 202a-202c (e.g., a smartphone) may form a group 212 of users for the shared account 210 together with the first user. The first computing device 201 may generate a group ID 204 corresponding to the group 212, for example the first user may invite at least one second user to join a shared account 210 (e.g., via a contact list in a mobile device) and accordingly a group ID 204 may be generated for the newly formed group of the at least one second user.

The first computing device 201 and the at least one second computing device 202a-202c may be in communication with a server 203, for instance with at least partial wireless communication.

In some embodiments, the first computing device 201 and the server 203 may be in communication with the blockchain based computer network 20 (e.g., a 'Bitcoin' network), in which a cryptographic key 220 corresponds to a public key and private key pair of the blockchain network 20. An account associated with the blockchain network 20 (e.g., controlled by the first user and having a unique address) may accordingly correspond with the cryptographic key 220.

In some embodiments, the first computing device 201 may generate a first share 211 of the cryptographic key 220, for instance using an MPC key generation protocol. The MPC protocol may jointly compute a function over the inputs from multiple parties, while keeping the inputs private, and split a cryptographic key into a plurality of shares or complementary portions of a single key, between a plurality of computing devices such that each party may hold a portion of the key corresponding to the transaction. Similarly, the server 203 may generate a second share 213 of the cryptographic key 220, such that the first share 211 and the second share 213 correspond to an account 210 of the blockchain based computer network 20. For example, both the first share 211 and the second share 213 may be required in order to perform an action with an asset of the corresponding account 210 of the blockchain network 20.

According to some embodiments, the system 200 may manage various actions for the shared account 210, by carrying out at least one of the following actions: creation, sharing, sending transactions, modification, recovery and deletion, as further described hereinafter.

In some embodiments, a new shared account 210 may be created by the user of the first computing device 201, in communication with the blockchain network 20. For example, the user of the first computing device 201 may use a dedicated user interface (e.g., within a dedicated mobile application) to create a new shared account 210 and accordingly become the administrator of that account. The first computing device 201 and the server 203 may be in communication with the blockchain network 20, such that in order to make the newly created account in the blockchain network 20 to be a shared account, the server 203 may be required to hold a corresponding cryptographic key. Once the shared account 210 is created, a threshold signature scheme (TSS) key generation protocol and/or the MPC protocol may be utilized to split a cryptographic key, into a plurality of shares, for the first computing device 201 and the server 203. For example, the cryptographic key corresponding to the created shared account may be split into a first share for the first computing device 201 and a second share for the server 203.

In some embodiments, a distributed key generation MPC protocol may be used based on at least one of an elliptic curve digital signature algorithm (ECDSA), Edwards-curve digital signature algorithm (EdDSA) and a Schnorr signature algorithm. It should be appreciated that other MPC and signing protocols may be used as well. In some embodiments, the shares may be applied with threshold signatures addresses, where a threshold cryptosystem protects its private key by creating encrypted shares in a distributed manner among a plurality of computers, as explained herein. In order to sign a message, several parties (more than some threshold number) may cooperate in the signature protocol with corresponding signing, such as in the MPC protocol. In a threshold cryptosystem, at least one threshold signature address (e.g., one address for each party) may be assigned, where the number of such address may be greater than some threshold number.

Since the key generation protocol is a distributed key generation MPC protocol and/or TSS protocol, the generated shares may remain at their respective device, such that these shares of the cryptographic key may only be utilized for signing messages and may not be transferred within the system 200. It should be noted that the first share 211 and the second share 213 may be generated separately, wherein both the first share 211 and the second share 213 are required in order to sign a transaction at the blockchain based computer network 20, for instance with their combination that may correspond to an equivalent private cryptographic key of the computer network. In some embodiments, the server 203 may be provided with an encrypted version of the second share 213, which may correspond to the first share 211, where the second share 213 may be encrypted with a public key. The encrypted version of the second share 213 may be created on the first computing device 201 (e.g., the administrator of the shared account 210) and sent to another device within the shared account group via the server 203, for example to verify that indeed the encrypted second share 213 is matching its share, using the "public share verifiability" property. In some embodiments, a share may have the "public verifiability" property if any party may verify the validity of the shares.

In some embodiments, the shared account 210 may be shared with other users when the user of the first computing device 201 (e.g., the administrator of the shared account 210) defines at least one additional second user of a second computing device 202a-202c to share the account 210, for instance selecting users for the group 212. The user of the first computing device 201 may also define a signing logic and/or order scheme 222, for example a scheme indicating that a user of second computing device 202a must sign first, and then at least one of the users of second computing device 202b, 202c may sign accordingly, for instance in order to carry out a transaction at the blockchain network 20. In some embodiments, the signing logic may be arbitrary, for instance not related to the blockchain network (e.g., depending on external parameters such as time, date and/or weather, for example depending on parameters not related to blockchain technology such as rainy weather or national holiday).

In some embodiments, encryption of cryptographic keys and/or shares for the first computing device 201 and/or the server 203 may be carried out using a verifiable homomorphic ElGamal encryption. In some embodiments, the user of the first computing device 201 may securely share the first share 211 with each user of the group 212 using the verifiable share transfer algorithm. According to some embodiments, server 203 may be able to verify the authenticity of shares without actually supplying the decryption key that in case that the decryption key is provided, the encrypted first share 211 of the cryptographic key 220 may be decrypted to the private key that corresponds to the relevant public key, that given that correct private key the user of the first computing device 201 may recreate all of its individual keys using the universal HD property.

In some embodiments, the user of the first computing device 201 may locally generate on the first computing device 201 a new key pair (private and public) of the same curve(s) of the first share 211 and second share 213 of the shared account 210. The user of the first computing device 201 may encrypt the first share with that public key and send the encrypted share along with the public key used to encrypt it. Using the verifiable share transfer algorithm, the server 203 may be able to verify that the encrypted share indeed corresponds to its share, with no need to explicitly decrypt it.

In some embodiments, an invite may be sent to the group 212 members, for instance by the user of the first computing device 201. For example, the invite may be sent by the first computing device 201 via a dedicated mobile application or externally (e.g., via email, SMS, etc.). The invite may include the private key that corresponds to the public key used to encrypt the encrypted share. Once the encrypted share is sent to the server 203 and all invites are sent, the user of the first computing device 201 may forget and/or delete the generated key pair. Once a member of the group 212 accepts the invite and if for instance that member is online in the mobile application or otherwise in communication with the server 203, the corresponding share may be sent to it from the server 203 such that each member of the group 212 may decrypt its share. In some embodiments, the user of the first computing device 201 does not need to be online at this stage while at least one user of group 212 may be online.

According to some embodiments, the server 203 may retrieve the group ID 204 and the first share 211 from the first computing device 201. In some embodiments, the at least one second computing device 202a-202c may retrieve from the server 203 at least one of: the group ID 204, the first share 211, and the private key to the cryptographic key 220. In some embodiments, the private key may be configured to decrypt at least one of the first share 211 and the second share 213 of the cryptographic key 220 that are encrypted by the public key.

In some embodiments, the first computing device 201 may be configured to enforce a signing logic scheme 222 (e.g., as shown in FIG. 2B) for users of the group 212 when signing with the shared cryptographic account 210. For example, the signing logic scheme 222 may be that signatures of two out of four users (e.g., the first users and three second users) are required in order to carry out a transaction in the blockchain network.

In some embodiments, at least one transaction (of the blockchain network 20) may be initiated by at least one of: the user of the first computing device 201 and members of the group 212. If the transaction is valid (e.g., having sufficient funds, the initiating member is entitled to create a transaction according to the group policy, etc.), the server 203 may sign the transaction with the corresponding second share 213, for example with the MPC protocol. In some embodiments, the server 203 may store the command to execute the transaction in memory but does not yet send to the blockchain network 20 for execution, for instance until another term of the transaction is fulfilled (e.g., until a predefined time arrives). In some embodiments, details of the transaction may be sent to all members of the shared account 220 for signing, according to the predefined signing logic 222. When the signing logic is satisfied (e.g., three out of five members have signed) the server 203 may use the second share 213 for signing and send the transaction to the blockchain network 20 for execution. In some embodiments, when the shared account 220 receives a transaction (e.g., receiving a cryptocurrency from an external user), the received transaction may be updated on the shared account 220 (e.g., via a dedicated user interface).

According to some embodiments, the user of the first computing device 201 (e.g., the administrator of the shared account) may control modifications in the group 212, for instance with elevated authentication (e.g., performing a "know your client" authentication or with server side biometrics). In some embodiments, the same quorum for signing may be needed to approve any modification in the group 212. For example, if an old signing logic 222 was "three out of five" and now the group's administrator wants "four out of five", then three out of five members of the group 212 need to approve that change.

In some embodiments, the user of the first computing device 201 (e.g., the administrator of the shared account) may select another member of the group 212 to be the "administrator" with the possibility to control modifications of the group 212 and/or the shared account 210. For example, all members of the group 212 may receive a corresponding notification when the "administrator" changes.

In some embodiments, the user of the first computing device 201 (e.g., the administrator of the shared account) may remove a user from the group 212. The server 203 may accordingly check if the removal requires changes to signing logic 222 (e.g., if it was five out of seven originally and now there are only four members left), if so a signing logic 222 change may be required. In some embodiments, each member of the shared account 220 may receive a notification when the group 212 is modified (e.g., notified via a dedicated mobile application).

Since the removed member had access to the first share 211, that share may be needed to change for the remaining users of the shared account 220 to prevent the removed user of exploiting the shared account 220 after being removed. In some embodiments, the first share may be rotated, using the rotation feature of the key generation protocol, to allow changing the shares while maintaining the same equivalent private/public key pair. As a result, the removed group member loses access to a valid share.

The key rotation method keeps the private key the same and also keeps the public key the same, while changing the private key shares. Thus, security of the system may be increased since the time window for a potential attacker to get both keys is significantly reduced. Using the key rotation method, attackers must get both key shares before any key-rotate operation while the key shares are unchanged. When the key rotation method is applied, if the attackers have one share before a rotation and the other after a rotation they will not be able to recover the private key.

In some embodiments, a member of the group 212 may choose to be removed from the shared account 212. In case that the user of the first computing device 201 chooses to be removed, the server 203 may selects a new "administrator" arbitrarily. In some embodiments, the user of the first computing device 201 may also delete the shared account 210, for instance when there are no assets associated with the corresponding address on the blockchain network 20.

In some embodiments, the user of the first computing device 201 (e.g., the administrator of the shared account) may add a user to the group 212, for instance with a corresponding notification to other members of the group 212. The first share 211 may be distributed from the user of the first computing device 201 to the new member in the same manner as for the other members.

According to some embodiments, the shared account 210 may be recovered, for instance in case that a user of the shared account 210, such as the user of the first computing device 201 and/or the server 203, is no longer available. Each user of the shared account 210 may securely backs-up all of his accounts shares in advance and recover them at a later stage. For example, if an account member loses access to their computing device (e.g., if a smartphone is lost), the member may perform personal recovery. In some embodiments, information of members of the group 212 may be stored at the server 203 and accordingly used for recovery (e.g., sent from the server 203) if needed at a later stage.

According to some embodiments, in case either computing device becomes unavailable a recovery process may take place. The first computing device 201 may communicate with an external trusted server to retrieve authentication data for recovery of at least one of the first computing device 201 and the at least one second computing device 202. The at least one second share 213 may be stored at the external server, and wherein upon detection that the at least one second computing device 202 is offline the external server may send the at least one second share 213 to the at least one second computing device 202 and authenticate the at least one second share 213 by the first computing device 201. Similarly, the at least one first share 211 may be stored at the external server, and wherein upon detection that the first computing device 201 is offline the external server may send the at least one first share 211 to the first computing device 210 and authenticate the at least one first share 211 by the at least one second computing device 202.

In some embodiments, recovery of the first computing device 201 may be allowed through know your customer (KYC) authentication. The user of the first computing device 201 may create authentication data on the server side, for instance using a third-party KYC service such that this user may validate its identity. The service provider (or server 203) may receive verified real-world details (e.g., name, date of birth, address, face recognition data, etc.) of the user. In some embodiments, the user may generate a key pair with a randomized passphrase to protect the private key and send a certificate signing request (CSR) to the server 203 to create a transport layer security (TLS) certificate. The server 203 may send the TLS certificate to the user, and the user may send the certificate with an encrypted private key to the server 203 for storage. For simplicity, the user may store the passphrase (which may serve as a recovery secret) in plaintext, for instance on cloud storage, and then if the passphrase is forgotten or lost, recovery may be possible. In case that the user has lost its device and wants to recover its account, the user may provide a username, and the server may present alternative authentication option, such as, for example: KYC, single sign on (SSO), and the like, and the client may recover the passphrase, for instance from cloud storage. The user may authenticate (using, for example, the first computing device 201) its identity to the server 203 with the relevant authentication method: for instance, providing KYC details again through a third-party service. If authentication is successful, and the KYC details are verified and matching the details established on the on-boarding phase then the server 203 may send to the user relevant client key share (e.g., with an encrypted version) and the certificate with encrypted private key such that the user may decrypt the encrypted private key and regenerate its key pair. Using the decrypted private key, the user may decrypt the encrypted client share and may finally regain control of its blockchain assets.

In some embodiments, the user (e.g., user of the first computing device 201) may be provided with an encrypted version of the server's share of the cryptographic key (e.g., the at least one second share 213), which corresponds to the user's share (e.g., the at least one first share 211), where the server's share may be encrypted with a public key. The user may thus be able to verify that indeed the encrypted server share is matching its share, using the "public share verifiability" property. The server's recovery private key may be saved by an external trusted recovery party (e.g., by an external server), and when the recovery party determined that the server 203, is unavailable, it may release the server's recovery private key. In some embodiments, the server recovery key pair may be generated on an offline computer, where the secret may be split using secret sharing scheme (e.g., Shamir secret sharing, SSS). The parts of the secret (e.g., shares of the cryptographic key) may be then transferred, for instance via flash drive, to the centralized entities for storing at a cold storage (e.g., a safe).

In some embodiments, in case that the server recovery key pair is created offline, the server recovery public key may be sent to the at least one second computing device 202 and may be publicly posted while the server recovery private key may be securely transferred to the recovery party. In some embodiments, on the initial key generation event, and every event where the shares change (e.g., rotation), the server 203 may encrypt its share with the server recovery public key, with the encrypted share sent to the user. The user may receive the encrypted server share and verify that it matches its own user share using the "public server recovery public key "verifiability" property to store the encrypted share on the same storage as the client share.

In some embodiments, the user's device (e.g., the first computing device 201) may include code that can locally restore the private key that the two shares represent, given the server share, such that when server recovery is required, the recovery party may release the private key corresponding to the server's share. The user may then download the private key from the corresponding URL address and decrypt the encrypted server recovery share.

It should be noted that using the shared account protocol, users of a threshold signature and/or MPC based key management system for blockchain networks, may securely use a shared account, without changing their trust model. Even if the server becomes rogue, it cannot spend their assets. Additionally, the server may block the users from spending, but may be financially motivated not to do so. In some embodiments, advantages of the shared account protocol may include at least one of: no new entity is introduced, the server cannot spend users' funds, and the server enforces the signing logic when group members want to send.

In some embodiments, the shared account protocol may be ubiquitous across blockchain networks, since this solution works in the mathematical level and as a result it is agnostic to the specifics of the shared assets and specifically to the scripting capabilities of the different blockchain networks.

Another advantage of the shared account protocol is that using the already installed server 203 for communications, the users of the shared account 210 may refrain from creating a direct connection. Thus, refraining of disclosing parameters of their identity (such as their IP address) without compromising on the confidentiality or verifiability of the communications, and/or allowing communications in harsh environments (e.g. mobile internet) in which connections often break. The server may also be used as a proxy to support session resumption.

Figure 3B:
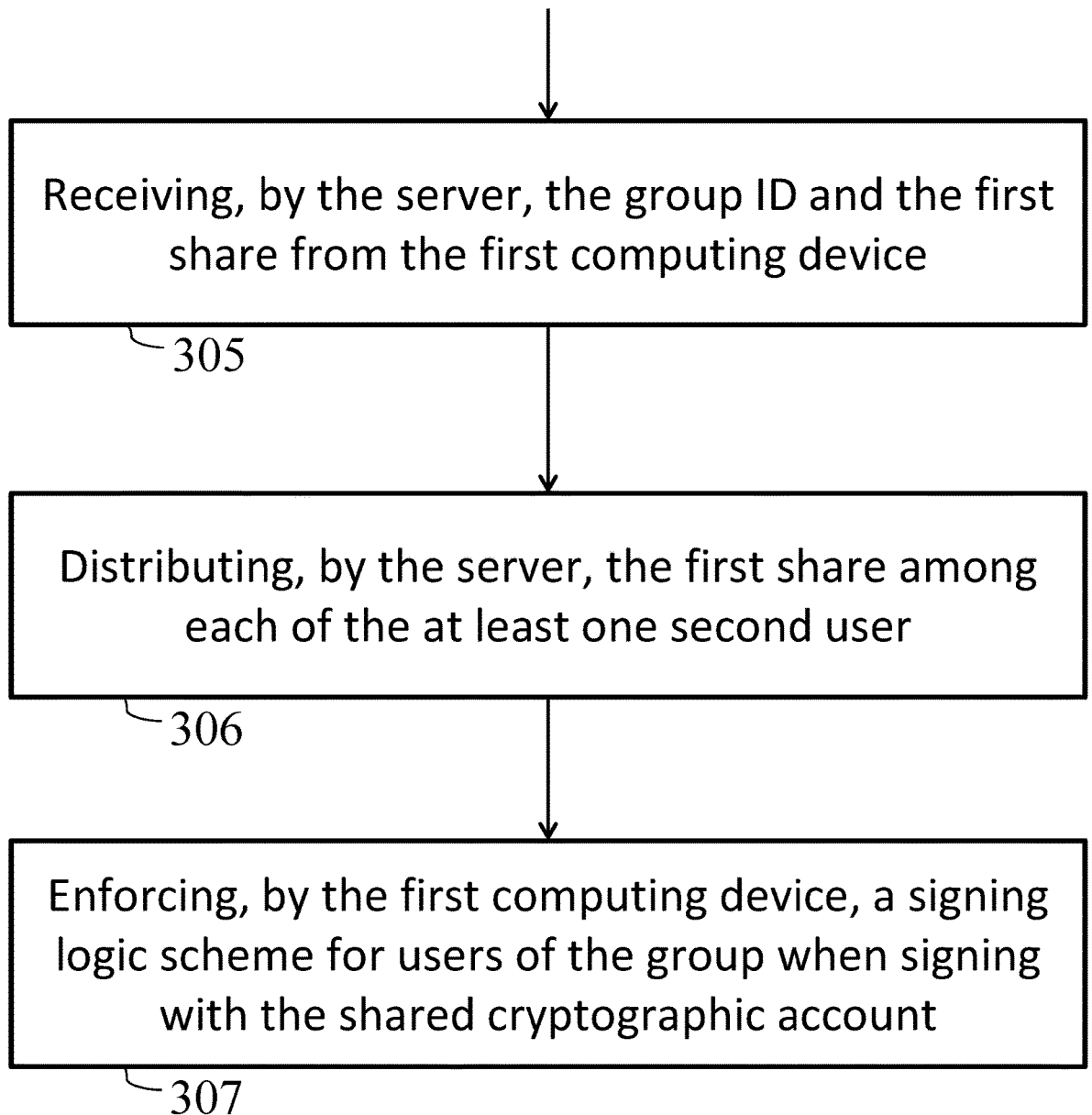

Reference is now made to FIGS. 3A-3B, which shows a flowchart of a method of managing a shared cryptographic account for a first user and at least one second user in a blockchain based computer network, according to some embodiments.

In Step 301, a first share of a cryptographic key may be generated (for instance by a first computing device of the first user), based on the MPC protocol. In Step 302, a corresponding second share of the cryptographic key may be generated (for instance by a server), based on the MPC protocol. In some embodiments, the cryptographic key may correspond to a public key and private key pair. In some embodiments, the private key may be configured to decrypt at least one of the first share and the second share of the cryptographic key that are encrypted by the public key.

In Step 303, a group ID may be generated, the group ID corresponding to a group of users of the shared cryptographic account. In Step 304, the group ID and the private key may be received by at least one second computing device of the at least one second user.

In Step 305, the group ID and the encrypted first share from the first computing device may be received by the server. In Step 306, the first share may be distributed (for instance by the server) among each of the at least one second user. In some embodiments, the at least one second computing device, of the at least one second user, may decrypt the encrypted first share, for instance using the received private key. In Step 307, a signing logic scheme may be enforced (for instance by the first computing device) for users of the group when signing with the shared cryptographic account. In some embodiments, the signing logic may be defined by the first computing device, or the second computing device, and that signing logic may be enforced by the server.

According to some embodiments, any number of computing devices and/or computer networks may similarly apply, where each additional computing devices and/or additional computer networks may add another portion to be shared for each cryptographic key.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of managing a shared cryptographic account for a first user and at least one second user in a blockchain based computer network, the method comprising:
   generating, by a first computing device of the first user, a first share of a cryptographic key, based on a multi-party computation (MPC) protocol;

generating; by a server; a corresponding second share of the cryptographic key, based on the MPC protocol, wherein the cryptographic key corresponds to a public key and private key pair, and wherein the private key is configured to decrypt shares of the cryptographic key that are encrypted by the public key;

generating a group ID for a group of users of the shared cryptographic account;

receiving, by at least one second computing device of the at least one second user, the group ID and the private key;

receiving, by the server, the group ID and the first share from the first computing device;

distributing, by the server; the first share among each of the at least one second user; and enforcing a signing logic scheme for users of the group when signing with the shared cryptographic account;

sending a message signed with the first share to the server;

signing, by the server, the received message with the second share; and adding a transaction to a ledger of the computer network, in accordance with the received message signed by the first share and second share, wherein the message signed by the first share and the second share is configured to be decrypted by the private key, and wherein the message is signed by at least one of: the first computing device and the second computing device, wherein the group comprises the first user and the at least one second user.

2. The method of claim 1, wherein the signing logic scheme comprises a signing order among the users of the group.

3. The method of claim 1, further comprising verifying at least a portion of a cryptographic key of the computer network, wherein the verifying comprises:

encrypting, by the first computing device, at least a portion of the cryptographic: key with the public key;

sending, by the first computing device, the encrypted at least a portion of the cryptographic key to the server;

retrieving, by the server, the public key from the first computing device; and verifying, by the server, that the encrypted at least a portion of the cryptographic key is compatible to be decrypted by the private key, based on the retrieved public key and the corresponding public key of the at least a portion of the cryptographic key.

4. The method of claim 1, wherein the server receives the group ID and the private key from the first computing device.

5. The method of claim 1, further comprising:
receiving, by the first computing device, the public key and the private key; and
receiving, by the server, the public key.

6. The method of claim 5, further comprising distributing, by the server, the public key among each of the at least one second user.

7. The method of claim 1, wherein the group ID is generated by the first computing device.

8. The method of claim 1, further comprising adding at least one second user to the group.

9. The method of claim 1, further comprising:
removing at least one second user from the group; and
applying a key rotation protocol on the first share.

10. The method of claim 1, further comprising applying a key rotation protocol on at least one of the first share and the second share.

11. The method of claim 1, further comprising distributing, by the first computing device, the group ID and the private key among the at least one second user.

12. The method of claim 1, further comprising distributing, by the server, the group ID among the at least one second user.

13. A system for management of a shared cryptographic account for a first user and at least one second user in a blockchain based computer network, the system comprising:

a first computing device of the first user, configured to:
generate a first share of a cryptographic hey, based on a multi-party computation (MPC) protocol; and
generating a group ID for a group of users of the shared cryptographic account;

a server, in communication with the first computing device and configured to:
generate a corresponding second share of the cryptographic key, based on the MPC protocol, wherein the cryptographic key corresponds to a public key and private key pair, and wherein the private key is configured to decrypt shares of the cryptographic key that are encrypted by the public key;
retrieve the group ID and the first share from the first computing device;
receive a message signed with the first share;
sign the received message with the second share; and
add a transaction to a ledger of the computer network, in accordance with the received message signed by the first share and the second share;

and at least one second computing device of the at least one second user, configured to receive from the server:
the group ID;
the private key; and
the first share, wherein the first computing device is configured to enforce a signing logic scheme for users of the group when signing with the shared cryptographic account, wherein the group comprises the first user and the at least one second user, and wherein the message signed by the first share and the second share is configured to be decrypted by the private key, and wherein the message is signed by at least one of: the first computing device and the second computing device.

14. The system of claim 13, wherein the signing logic scheme comprises a signing order among the users of the group.

15. The system of claim 13, wherein the server is configured to distribute at least one of the public key, the group ID and the private key among each of the at least one second user.

16. The system of claim 13, wherein the group ID is generated by the first computing device.

17. The system of claim 13, wherein the server is configured to apply a key rotation protocol on at least one of the first share and the second share.

18. The system of claim 13, wherein the first computing device is configured to add at least one second user to the group.

19. The system of claim 13, wherein the first computing device is configured to remove at least one second user from the group.

* * * * *